United States Patent [19]

Fisher

[11] Patent Number: 5,929,440
[45] Date of Patent: Jul. 27, 1999

[54] ELECTROMAGNETIC RADIATION DETECTOR

[75] Inventor: Michael Aaron Fisher, White Plains, N.Y.

[73] Assignee: Hypres, Inc., Elmsford, N.Y.

[21] Appl. No.: 08/738,396

[22] Filed: Oct. 25, 1996

[51] Int. Cl.$^6$ ....................................................... G02F 1/00
[52] U.S. Cl. .................... 250/338.1; 250/336.1; 250/332
[58] Field of Search ............................. 250/336.1, 338.1, 250/330, 332

[56] References Cited

U.S. PATENT DOCUMENTS

| | | | |
|---|---|---|---|
| 3,415,712 | 12/1968 | Barker, Jr. | 374/205 |
| 3,896,309 | 7/1975 | Halsor et al. | 250/370.14 |
| 4,762,426 | 8/1988 | Foss | 374/130 |

OTHER PUBLICATIONS

Barnes et al, "Photothermal Spectroscopy with Femtojoule Sensitivity Using a Micromechanical Device", Nature, 372(3), Nov. 1994, pp. 79–81.

Primary Examiner—David P. Porta
Assistant Examiner—Richard Hanig
Attorney, Agent, or Firm—Henry I. Schanzer

[57] ABSTRACT

An electromagnetic radiation (EMR) responsive detector includes an array of multi-layered cantilevers with each cantilever having at least a first layer for absorbing EMR signals and a second layer for reflecting light incident on the second layer. Each cantilever is formed so it can absorb EMR which gets converted into heat which then causes the cantilever to bend proportionately to the amount of EMR energy it absorbs. The amount of EMR absorbed by each cantilever of the array is optically read-out (sensed) by illuminating the cantilevers of the array and sensing the light reflected from each cantilever. Various schemes for projecting light onto the array and sensing the reflected light are disclosed. The optical read-out of the array eliminates the need for electronic read-out circuitry and accessing wires to be formed on the array. The simplicity of the structure of the array elements and eliminating the need for read-out wiring and electronics permits the fabrication of a detector array with extremely high packing density.

22 Claims, 15 Drawing Sheets

Deposition of absorptive and reflective layers upon Substrate:

Back-etch of Substrate:

Patterning and "Punch-through" of absorptive and reflective layers:

ELECTROMAGNETIC RADIATION DETECTOR

BACKGROUND OF THE INVENTION

This invention relates to an electromagnetic radiation responsive detector which can be read out optically and, in particular, to an electromagnetic radiation detector operable at room temperature which can be read out using either a laser based system or any other suitable light source.

When referring to electromagnetic radiation ("EMR") herein and in the appended claims, the entire electromagnetic spectrum is included ranging from gamma rays to radio waves and, of course, including infrared, visible and ultraviolet radiation.

Known infrared imaging systems employ arrays of mercury-cadmium-telluride (HgCdTe) detectors operating at cryogenic temperatures. These detectors are extremely sensitive. Many of these detectors are for use in applications designed for thermal imaging, where a typical "benchmark" of desired sensitivity is the ability to discriminate a temperature change of 0.04° C. However, there are many applications where lower sensitivity would suffice and/or where the requirements to operate at cryogenic temperatures are not practical or desirable.

It is therefore desirable to have a detector which can achieve the benchmark sensitivity while operating at room temperature. That is, it is desirable to have an array of electromagnetic radiation responsive detectors which does not require cooling.

SUMMARY OF THE INVENTION

Electromagnetic radiation (EMR) responsive detectors and imagers embodying the invention include an array of self-supporting microscopic structures. Each structure can absorb electromagnetic radiation signals and includes a mechanism for indicating a rise in temperature which is proportional to the amount of the absorbed electromagnetic radiation signals.

An EMR detector embodying the invention includes an array of multi-layered cantilevers with each cantilever having at least a first layer for absorbing EMR signals and a second layer for reflecting light incident on the second layer. Each cantilever can be formed having virtually any desired shape; although in practice, for ease of fabrication, a simple rectangular structure may be preferred. Each cantilever is formed so its first layer can absorb EMR signals which get converted into heat which then causes the cantilever to bend proportionately to the amount of EMR energy it absorbs. The amount of energy absorbed by each cantilever of the array is optically read-out (sensed) by illuminating the second layer of each cantilever of the array and sensing the angle of the reflected light which is indicative of the amount (degree) by which the cantilever is bent. Since the cantilevers are designed to reflect an incident beam of light to indicate the amount of bending, the cantilever is also sometimes referred to herein, and in the appended claims, as a "light lever". The optical read-out eliminates the need for electronic read-out circuitry and accessing wires to be formed on the array. The simplicity of the structure of the array elements and eliminating the need for read-out wiring and electronics permits the fabrication of a detector array with extremely high packing density.

Detector arrays embodying the invention may be formed using amorphous and polycrystalline films and may be made using only two mask patterns, resulting in very low fabrication costs.

In a preferred embodiment, each light lever of an array of light levers includes two layers, one layer being on top of the other. The first layer is comprised of a first material designed to absorb electromagnetic radiation signal energy, and the second layer is of a second material which is highly reflective. The first and second materials have different coefficients of thermal expansion whereby when electromagnetic energy is absorbed by the first layer, the light lever heats up and bends as a function of the amount of signal energy absorbed which is converted into heat. A light beam is projected onto the second layer of the light levers of the array and the incident light beam is reflected back from the second layer onto a photodetector. The light reflected from each light lever is reflected at an angle indicative of the extent to which the light lever is bent, and the photodetector is calibrated to produce a signal proportional to the angle.

The light source may be a laser beam which is swept across the light levers of the array. The characteristics of the light source and the second reflective layer of the cantilever are selected such that substantially all of the light incident on the second layer is reflected; i.e., there is little, if any, absorption of the sensing light energy by the second layer. Where a beam of light is swept across the array of light levers, the spot size of the beam is preferably no greater than the width of the light lever and preferably smaller than the length of the light lever.

The light source may also be a point source of light projected on a linear (one dimensional) or a matrix (two dimensional) array of cantilever elements. Light incident on the array of cantilever elements may then be reflected onto an array of light sensors to indicate the extent to which each cantilever element is bent.

BRIEF DESCRIPTION OF THE DRAWINGS

In the accompanying figures, like reference characters denote like components.

DETAILED DESCRIPTION OF THE INVENTION

Figure 1A:
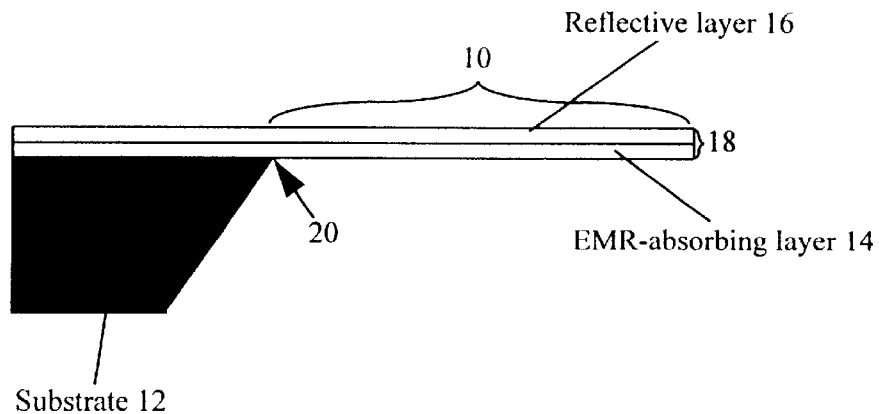
FIG. 1A is a cross section of a light lever for use in arrays embodying the invention.

FIG. 1A shows one element of a micromachined infrared detector in accordance with the invention. Each element is constructed of two patterned thin films on a silicon wafer. No wire-bonding of leads is required because there are no leads. Polycrystalline amorphous films may be used to form the elements of the detector which are less expensive to fabricate than detectors requiring a single crystal.

Each element of the infrared detector includes a multilayer, micromachined cantilever 10 which extends out over an etched hole or pit in a substrate 12. The bottom layer of the cantilever is a self-supporting, radiation-absorbing film 14 of silicon nitride, which is extremely strong. The silicon nitride layer 14 may be replaced by any strong material which is also a good absorber of the electromagnetic radiation being detected. Silicon nitride is a particularly good absorber of infrared (IR) radiation. The entire top surface of cantilever 10 is coated with a layer 16 which may be 500 Å thick; the layer 16 may be a smooth, high quality aluminum or any other material suitable for reflecting a laser beam, or other suitable light source, without absorbing much heat. The "top" and "bottom" layers are selected to have significantly different coefficients of thermal expansion to cause the "top" layer to expand more than, or less than, the bottom layer when heated.

Figure 1B:
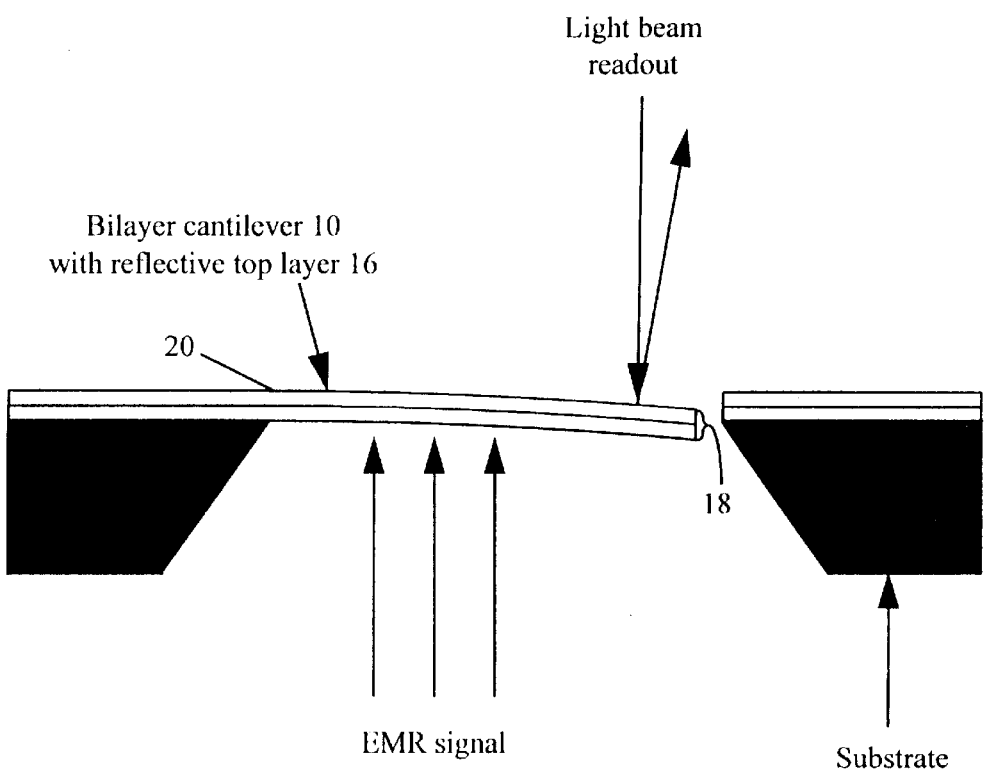
FIG. 1B is a cross section of a light lever operated in accordance with the invention.

When the underside (layer 14) of the cantilever 10 is exposed to an incident electromagnetic radiation signal (which may be, for example, infrared, optical, ultraviolet or X-ray), the radiation passes through the absorptive silicon nitride layer 14 (and possibly twice due to the reflecting layer on the top surface). As the bottom layer absorbs the electromagnetic radiation signal, the cantilever is heated, causing all of the material to expand. If the top layer, when heated, expands more than the bottom layer, it causes the reflective tip of the cantilever (also referred to herein as a "light lever") to bend downward at an angle proportional to the strength of the received electromagnetic signal, as shown in FIG. 1B. If the top layer expands less than the bottom layer, the top of the cantilever bends upward (not shown).

The cantilever may be formed using a "back-etching" process to remove the part of the substrate beneath the cantilever. In one embodiment, the cantilever can be made to have a thickness of 6,000 Å. Because the cantilever is so thin and because it is made of a low-thermal conductivity material, the thermal conductance from the tip 18 to the base 20 of the cantilever (See FIGS. 1A, 1B) is extremely small.

Therefore, a small quantity of absorbed radiation (e.g., infrared light) results in a large temperature rise. The micromachining fabrication process enables the production of such a thin (e.g., 6,000 Å) suspended cantilever which is tough enough to support itself and other thin films.

Figure 2A:
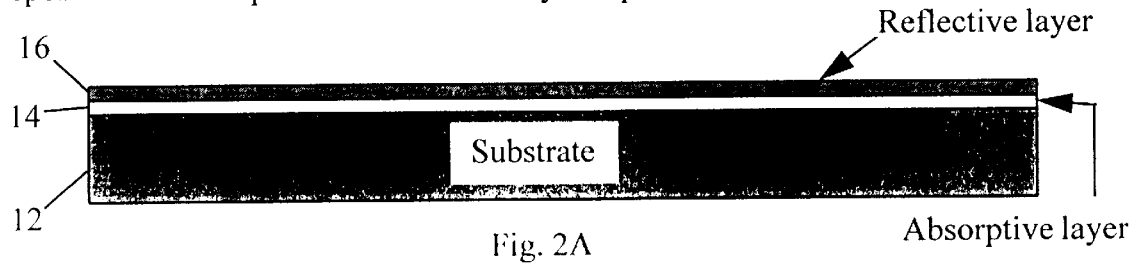
FIGS. 2A, 2B and 2C are cross section diagrams illustrating processing steps to form an array in accordance with the invention.
Figure 2B:
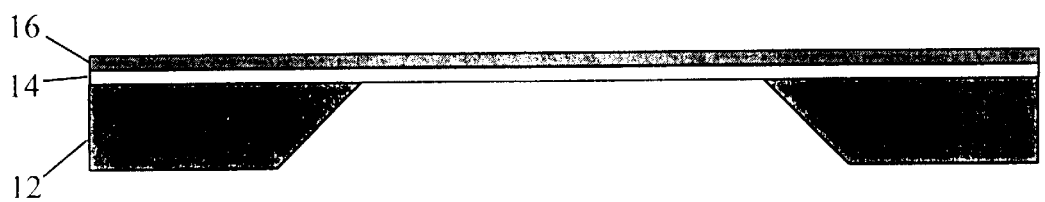
Figure 2C:
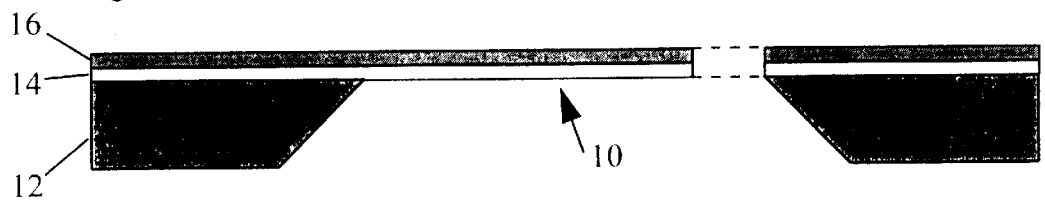
Figure 2D:
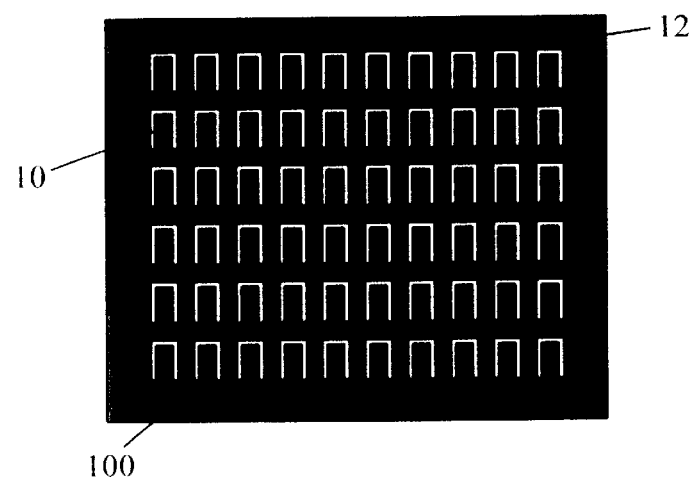
FIG. 2D is a top view of an array of cantilever elements in accordance with the invention.

The back-etching process is very versatile in terms of successfully defining a wide variety of shapes. An array 100 of cantilevers 10 may be formed as shown in FIGS. 2A–2D. As shown in FIG. 2A, silicon wafer 12 is coated with an EMR absorbing silicon nitride film 14 and then a reflective aluminum layer 16 is deposited in the nitride layer. The patterning of the cantilevers may then be performed by "back-etching" or undercutting the substrate surface, as shown in FIG. 2B. The cantilevers may be finally formed, as shown in FIG. 2C, by patterning and punching through the sides and one end of the absorptive nitride layer 14 and reflective layer 16 of each cantilever. This leaves the underside of the absorptive layer exposed and the top side of the reflective layer 16 also exposed. Thus, an array 100 of cantilevered elements 10 may be formed, as shown in FIG. 2D. It should be appreciated that the structure described in FIGS. 2A–2D is by way of example, and that other methods and materials may be used to form an array of elements which can bend or change shape in response to the absorbed energy.

Figure 3:
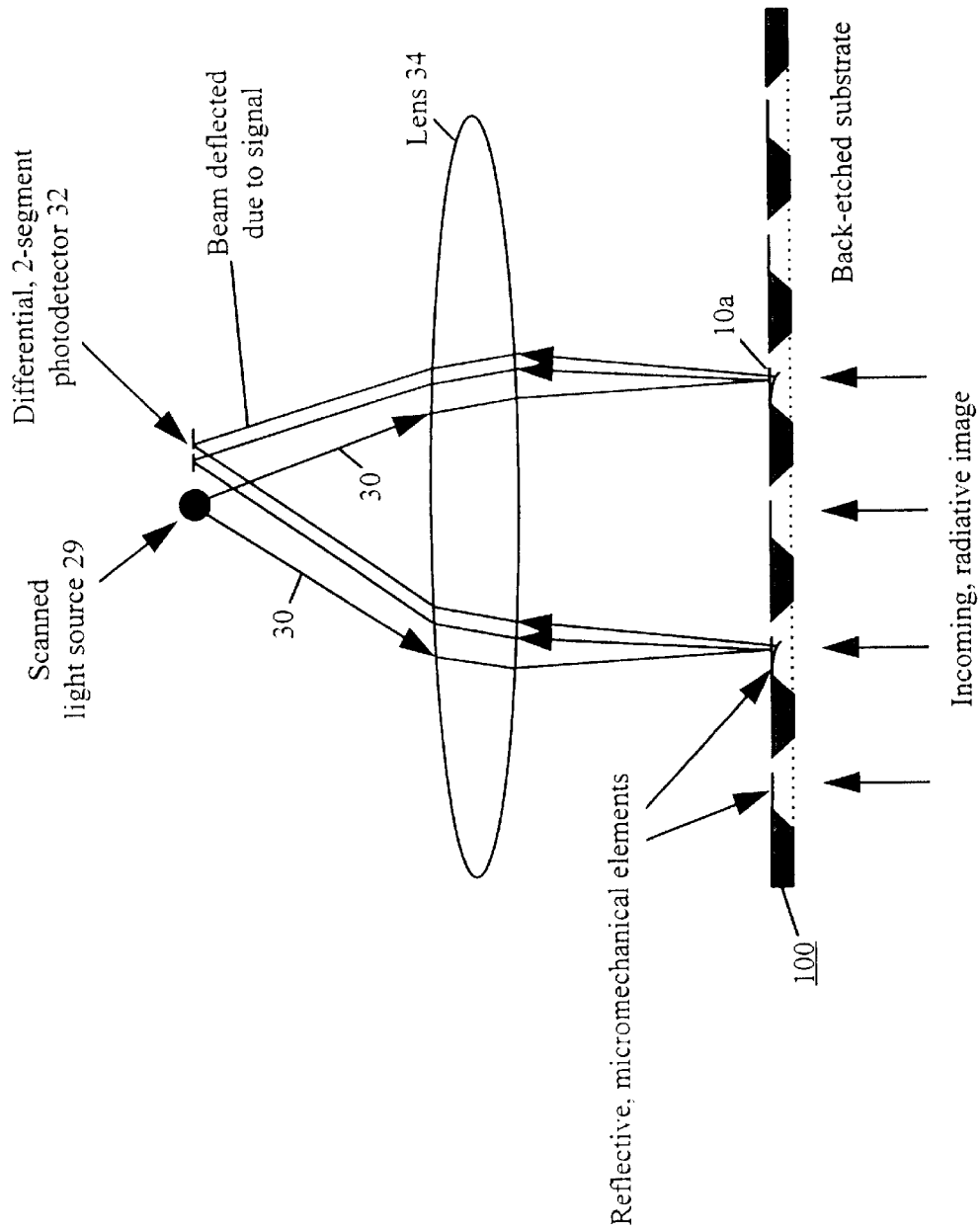
FIG. 3 is a drawing of an optical system for sensing the bending of cantilever elements of an array in accordance with the invention.
Figure 4:
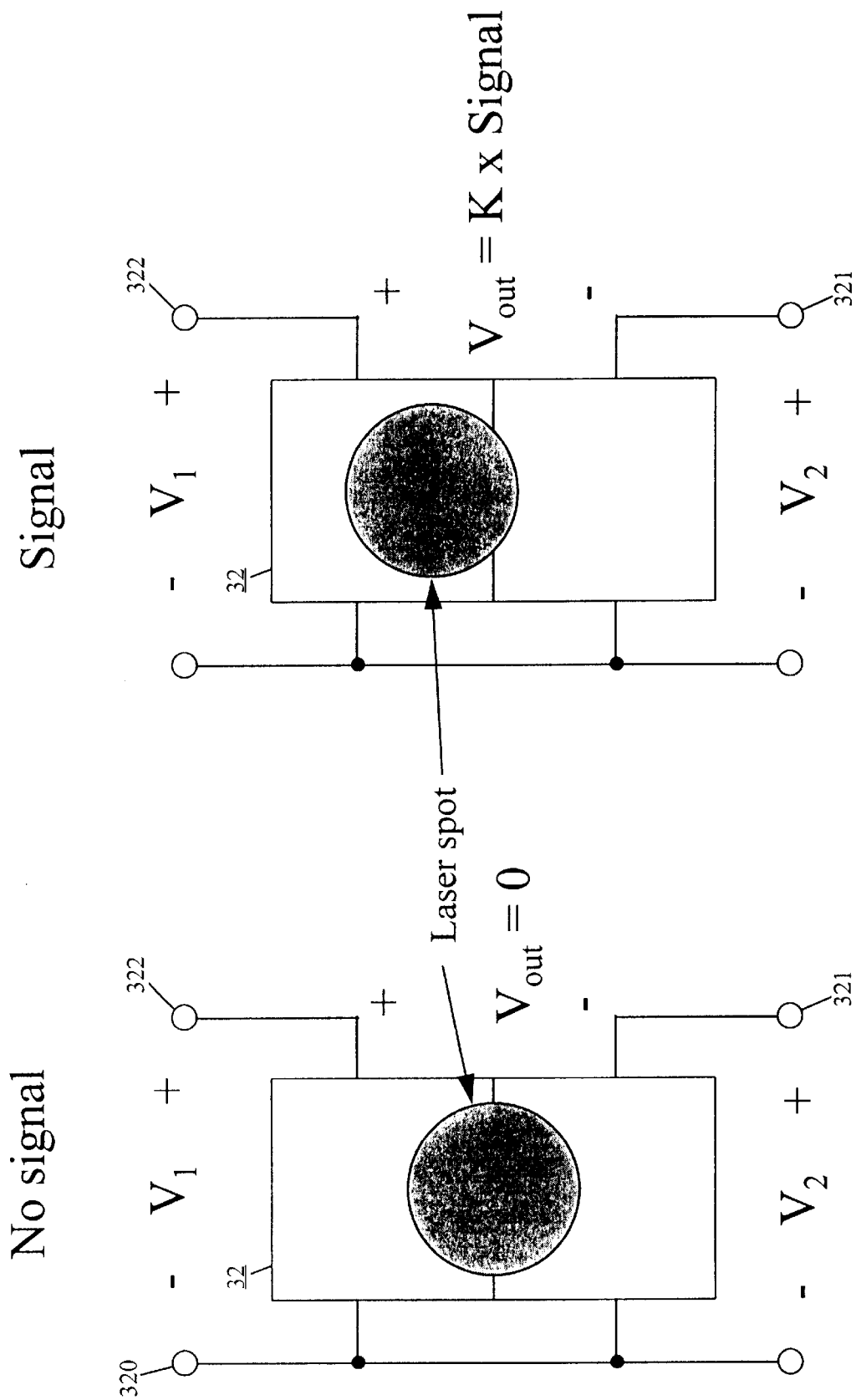
FIG. 4 is a drawing illustrating the effect of a reflected light beam on a photodetector used in an optical system embodying the invention.

The electromagnetic radiation (EMR) signal absorbed by the elements of a detector 10 may be sensed (read) as shown in FIG. 3. A laser light source 29 is focused to form laser beam 30 which is swept across the array 100 and aimed at the reflective tip of each two-layer cantilever 10. The light reflected from each cantilever (e.g., 10a) will be deflected at an angle proportional to the amount the cantilever (e.g., 10a) is bent with the extent of the bending being proportional to the amount of electromagnetic radiation (e.g., infrared) signal absorbed by the cantilever element. In FIG. 3, the incident laser beam 30 is reflected back to a (commercially available) two-segment photodiode 32 which can detect small changes in beam direction, as shown in FIG. 4. FIG. 4 illustrates that when the reflected light spot falls midway between the two photodiode segments (null position), a signal having a value of zero volts is produced. As the reflected light spot moves above or below the null position, a signal is produced which may then be amplified and then processed by known means.

A large array of cantilevers can be addressed by scanning, or rastering the beam across each row of detectors. Off-the-shelf, video-speed, mirror scanning systems are currently available. The output of the photodetector may be amplified and sent directly to a display screen in analog form or digitized for processing. Sampling rates up to 600 million samples/second and time resolutions down to 5 ns are possible in commercially available, 8-bit analog-to-digital converters, which will suffice for a 1000×1000 element array scanned at 30 frames per second (a total of 30 million samples/second).

Figure 13:
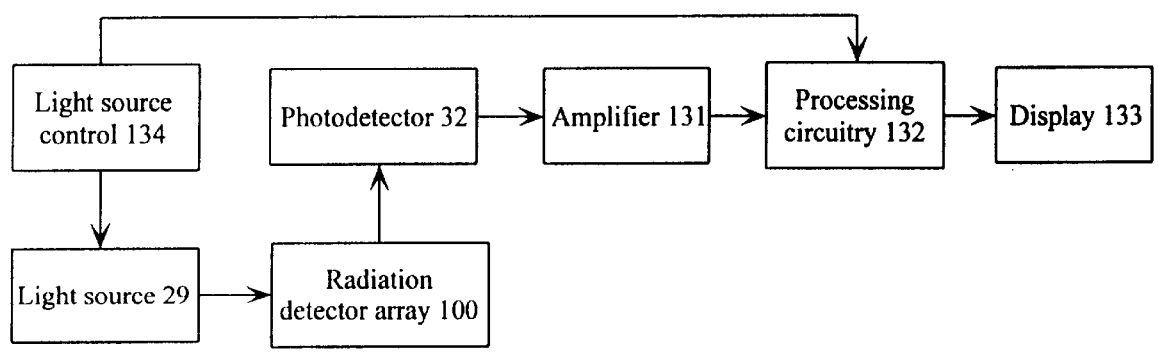
FIG. 13 is a block diagram of a system embodying the invention.

By way of example, FIG. 13 illustrates in block form, the use of a light source (e.g., 29) which is used to illuminate radiation detector array 100 with the reflected light sensed by a photodetector (e.g., 32) whose output is then amplified via amplifier 131 whose output is then processed via processing circuitry 132 and readied for application to a display means 133. The processing circuitry 132 and the light source 29 may be controlled by means of a light source and signal controller 134.

Figure 5A:
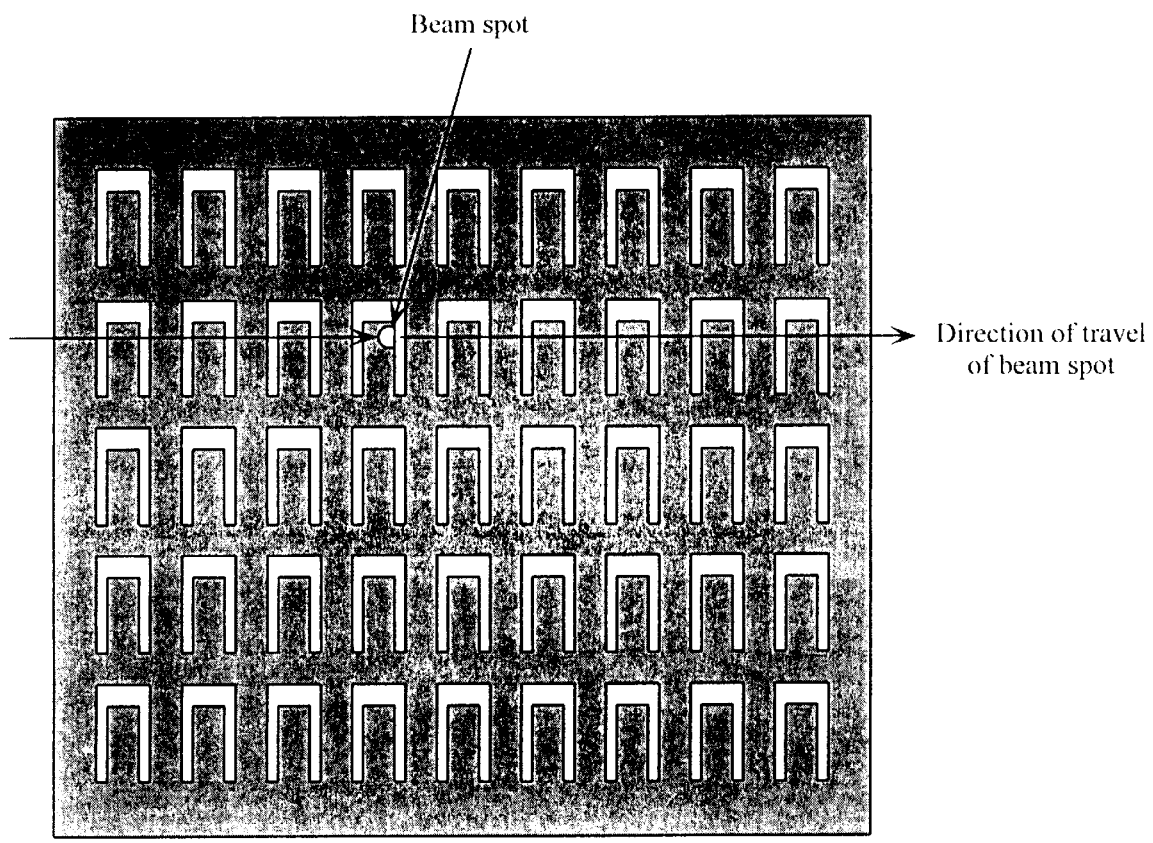
FIGS. 5A and 5B are drawings illustrating a light beam being swept across an array of light levers in accordance with the invention.
Figure 5B:
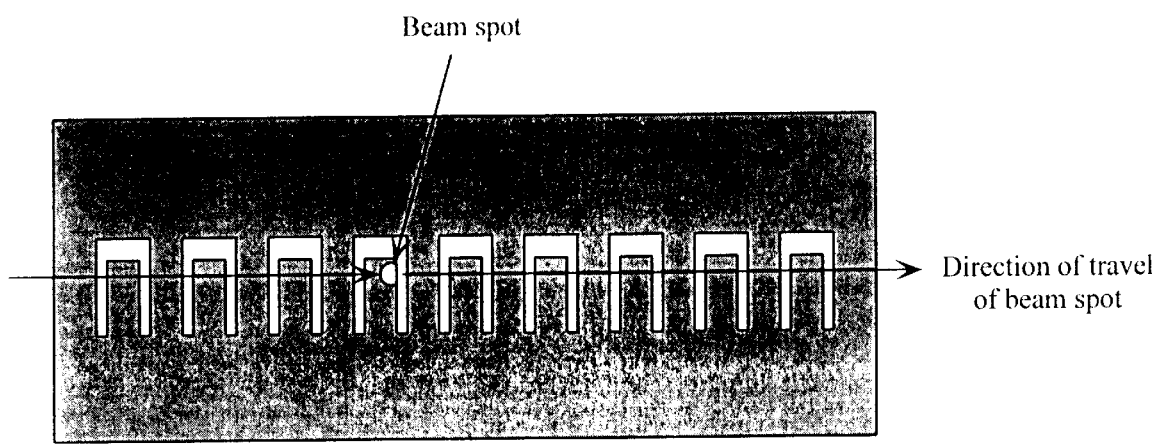

The cantilevers will usually be bent in an arc due to the incoming electromagnetic radiation signal (and the residual stresses in the films). In order for the angle of the reflected light beam to be constant as the beam spot travels over a cantilever, it is preferable that the light beam be swept in a direction along the width, and perpendicular to the length, of the cantilever, as shown in FIGS. 5A and 5B. Any slight curvature along the width of the cantilever is not important, because it translates to a beam spot displacement sideways on the photodetector (see FIG. 4), not in the direction affecting the output signal. This is, of course, true only if the curvature is not so severe that the beam spot misses the photodetector altogether.

In order for the detection of the laser beam to be done with a single photodetector pair, the beam should arrive at the same final location, regardless of which part of the cantilever array it hit. One way to ensure this is to position both the laser scanner and the photodiode at the focus of a single lens 34, which is placed between them and the detector array 100, as shown in FIG. 3. The light will be incident on the array at a nearly perpendicular angle, regardless of which pixel is being addressed. It will therefore be reflected back at the same angle, plus whatever small change in angle is caused by the bending of the cantilever due to the incoming electromagnetic radiation (e.g., IR) signal. The beam returns to the focus of the lens, which is the same place from which it came.

It is not necessary for the array to be oriented so that the incident beam hits it in a perfectly perpendicular fashion. In practice, the array may be positioned at a slight offset (angle) so that, for zero bending of the cantilever, the final destination of the returning beam is displaced slightly from its point of origin. In fact, this may be an important practical modification, since it allows the laser source and the photodetector to be positioned very close together, but not in exactly the same place, which would be physically impossible.

Figure 6A:
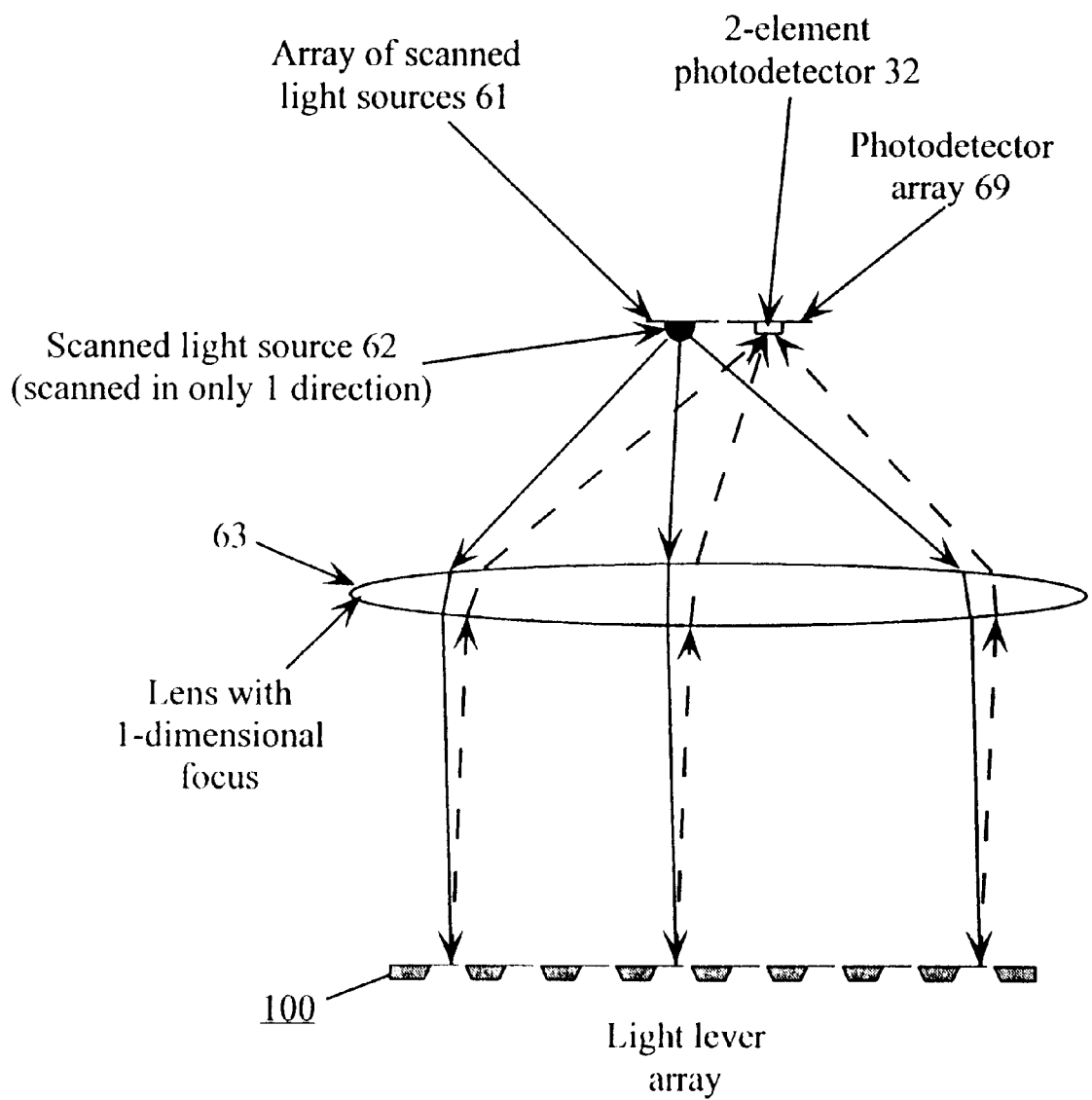
FIGS. 6A and 6B are drawings of different viewing angles of an optical system employing a one dimensional array of photodetectors for sensing the bending of the cantilever elements of an array in accordance with the invention.
Figure 6B:
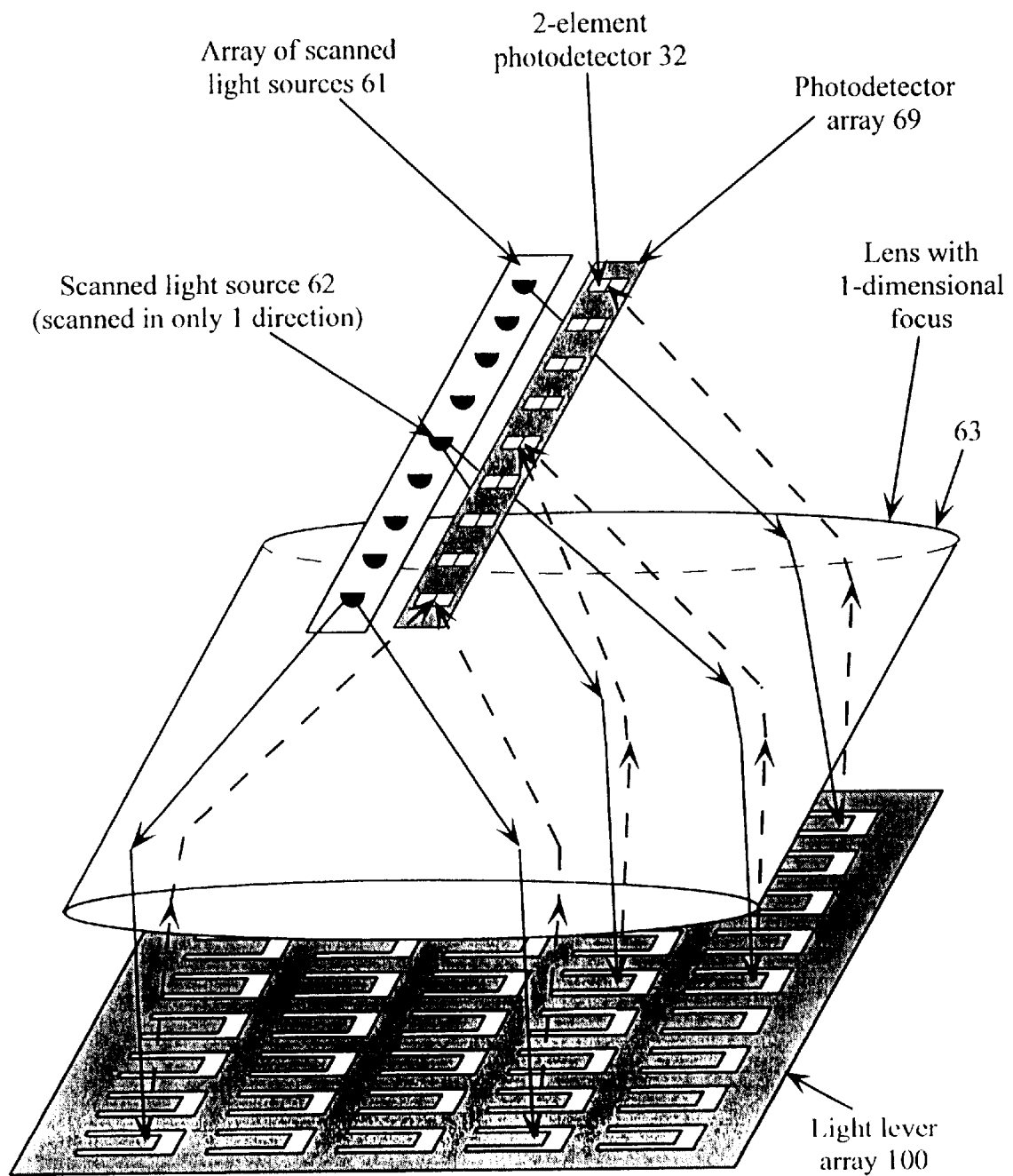

FIGS. 6A and 6B include an array 61 of light sources 62 which are swept (scanned) in one direction (vertically or horizontally) along the matrix array 100 of cantilever elements. The light from the light sources is projected via a lens 63 onto the cantilever elements. The light projected onto the cantilever elements is reflected and passes back through the lens 63 onto a linear photodetector array 69 comprised of 2-element photodetectors of the type shown in FIG. 4.

The optical readout system may be designed to use a 1-dimensional array of optical photodetectors and a 1-dimensional array with an equal number of scanned light sources, as shown in FIGS. 6A and 6B. In contrast to the system illustrated in FIG. 3, the light sources in the system shown in FIGS. 6A and 6B are swept (scanned) in only one direction, not both directions. In this case, the lens need only focus in one direction, that is, the direction in which the light sources are swept (scanned). One possible advantage of a detector using an array of light sources and an array of photodetectors is that, for a given frame rate, the signal from each pixel can be averaged N times as long, where N is the number of photodetectors (or light sources). This averaging or filtering technique can reduce the noise in the output signal and make the system more sensitive. Also, in some cases, a single direction scanning mechanism may be simpler to implement than a 2-direction mechanism.

Figure 7:
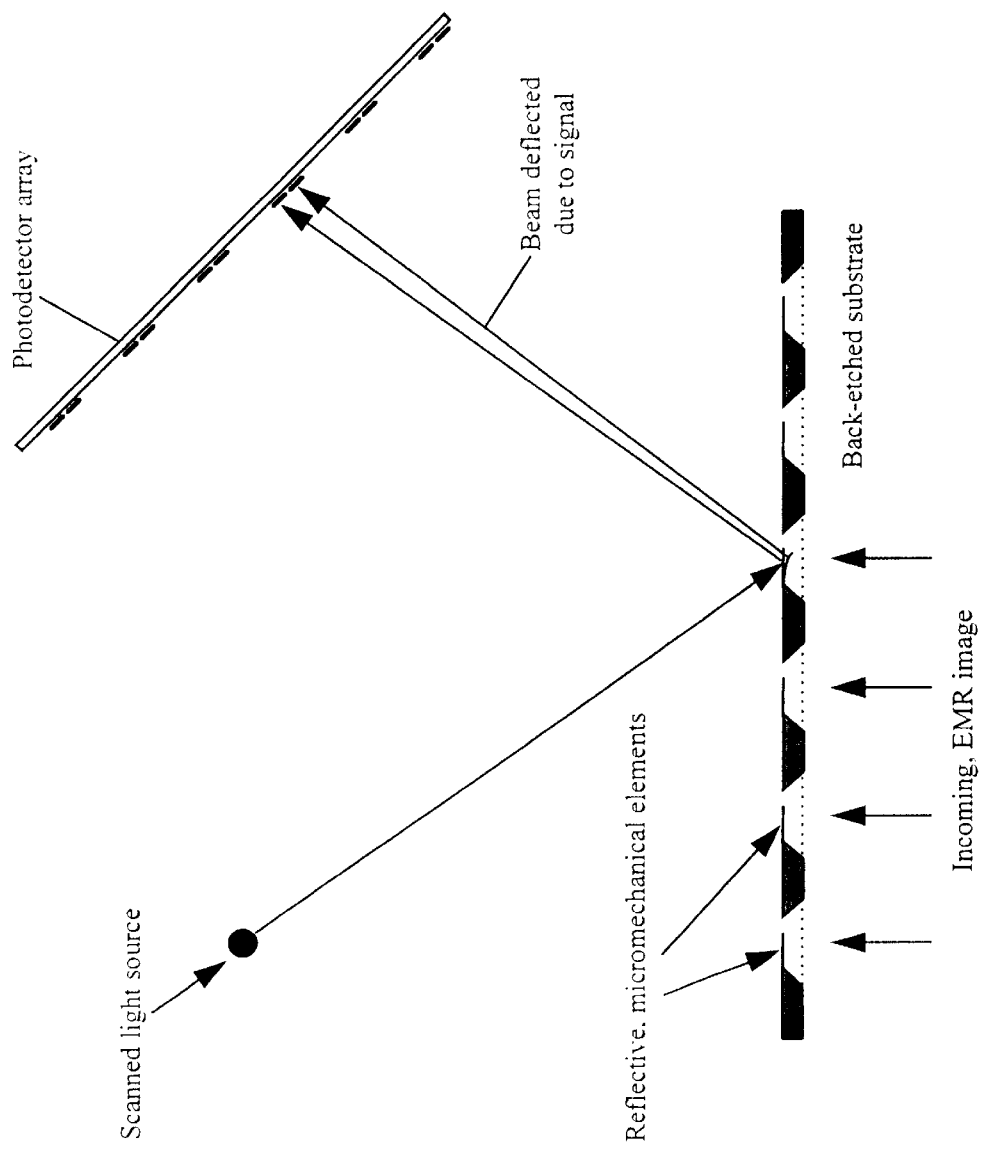
FIG. 7 is a drawing illustrating an optical system employing a scanned light beam and a 2-dimensional array of photodetectora for sensing the bending of cantilever elements of an array in accordance with the invention.

The optical read-out system may be designed to use a 2-dimensional array of photodetectors such as, for example, a charge-coupled device (CCD) array, as shown in FIG. 7. This configuration requires no lens since the beam does not need to return to the same target for zero bending of the cantilever.

Figure 8:
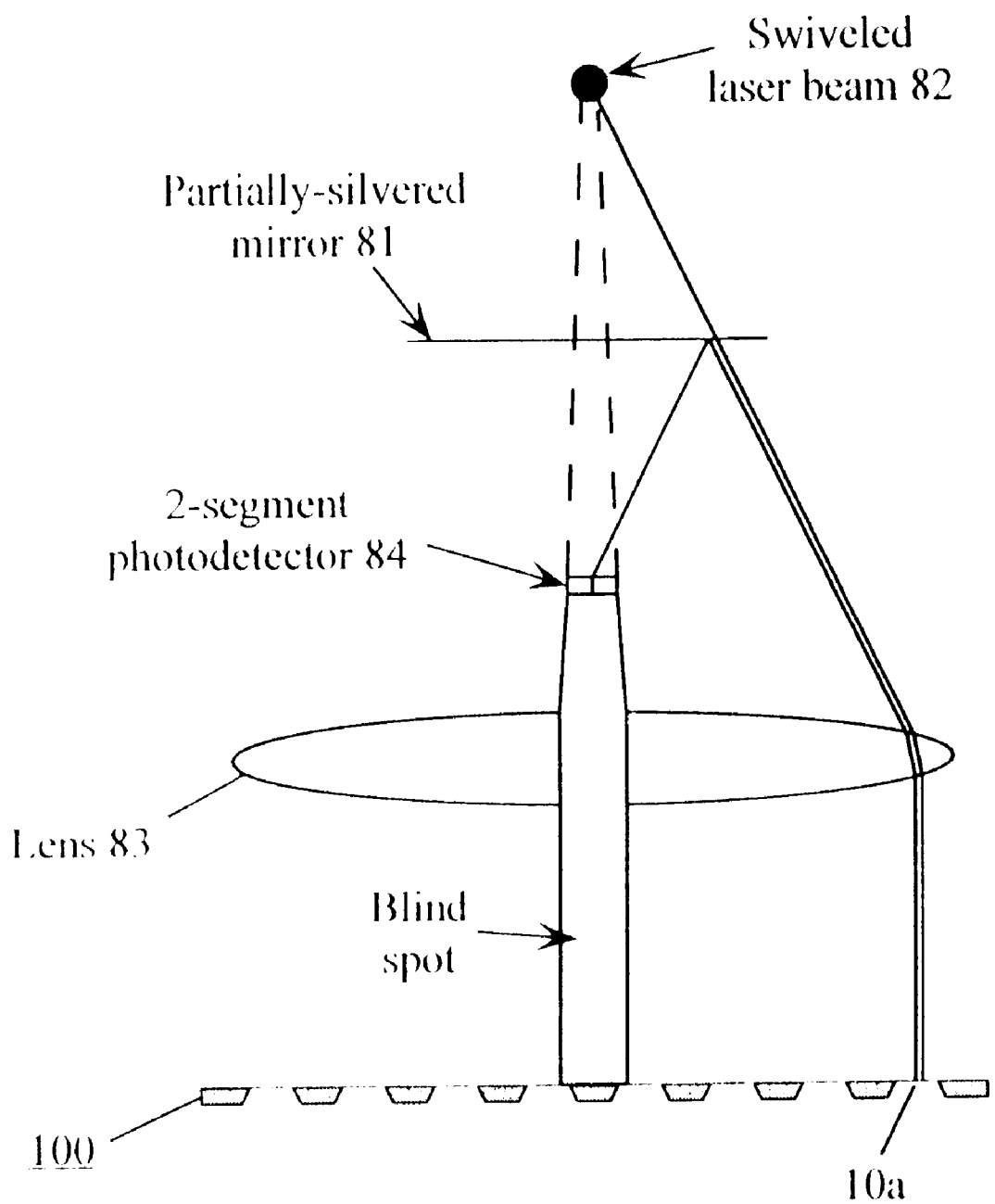
FIG. 8 is a drawing illustrating an optical system employing a single photodetector for sensing the bending of cantilever elements of an array in accordance with the invention.

An optical read-out system may be configured with a "partially-silvered", or partially reflective and transparent, mirror 81 between a laser 82 source and a lens 83, as shown in FIG. 8. The photodetector 84 may then be placed between the mirror 81 and the lens 83 so that its distance from the mirror is equal to the distance between the laser source and the mirror. A certain fraction of the light returning from the array 100, which would otherwise travel back to the laser source, is now reflected via lens 83 and mirror 81 to the photodetector 84. The photodetector 84 is located at a position which is, in effect, an alternate focus of the lens, due to the mirror. This design causes a "blind spot" due to shadowing of the lens and array by the photodetector but, if this blind spot is small enough, or if it falls between cantilevers, it should not be a significant drawback. The advantage of this configuration is that it avoids the problem of positioning the photodetector 84 very close to the laser source in the case where the laser source is large and bulky.

Figure 9:
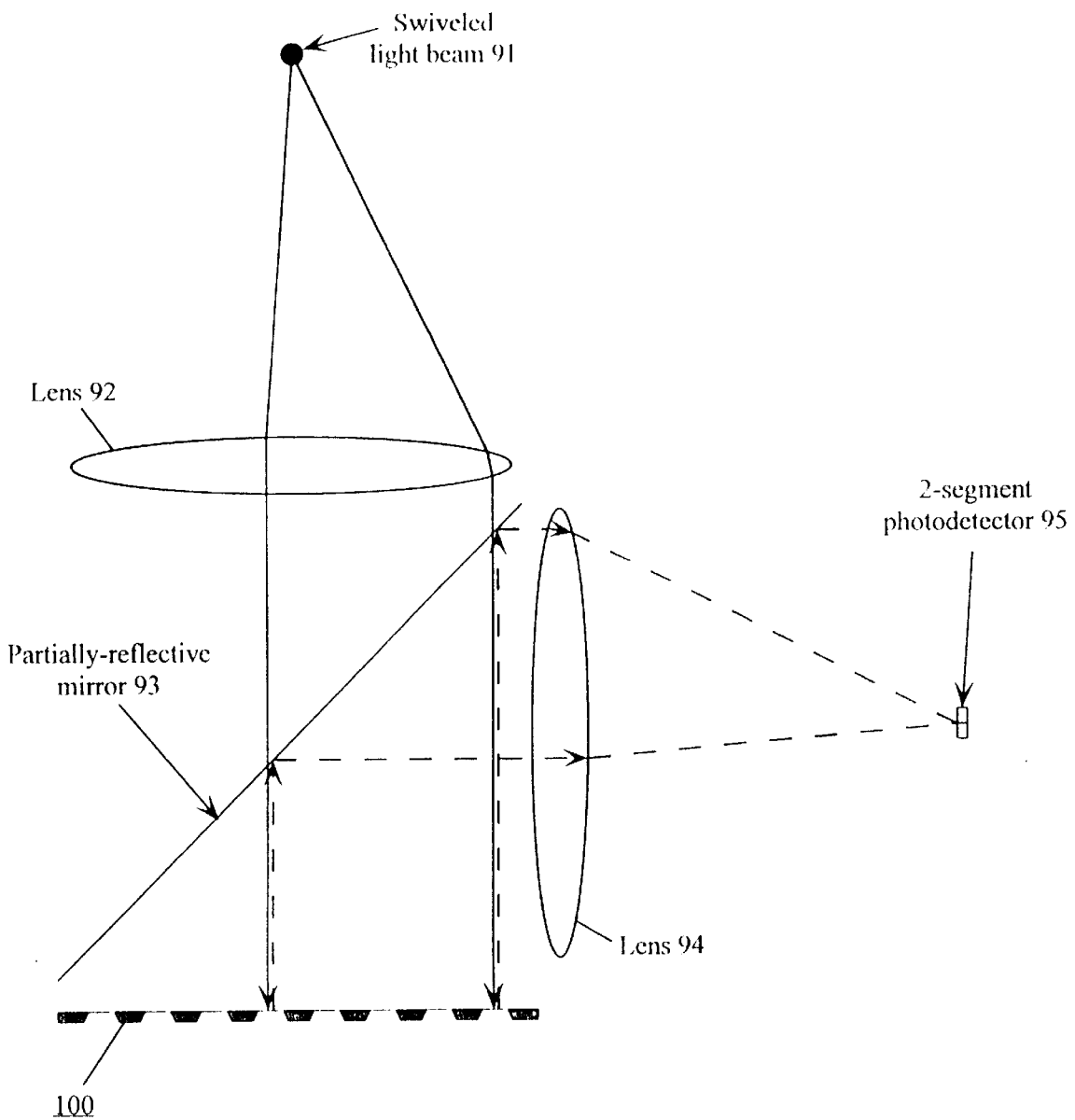
FIG. 9 is a drawing illustrating another optical system employing a single photodetector for sensing the bending of cantilever elements of an array in accordance with the invention.

In another optical read-out system, the photodetector is positioned to one side of the array using a lens and mirror assembly, as shown in FIG. 9. In this design, the light comes from a source 91 positioned at the focus of a lens 92 and is collimated by the lens. A fraction of the light passes through a partially reflective mirror 93 oriented at an angle, as shown in FIG. 9. The incident light is reflected back by the array 100 and a fraction of it is reflected at an angle by the mirror. It is focused by a second lens 94 and, finally, arrives at a photodetector 95, as shown in FIG. 9. Optionally, the relative positions of the light source and the photodetector, as shown in the figure, may be switched.

The light source or laser beam used to practice the invention may be of any wavelength that is easily reflected by the reflective surface at the ends of the cantilevers. This may include, but is not limited to, infrared, visible and ultraviolet wavelengths.

Figure 10:
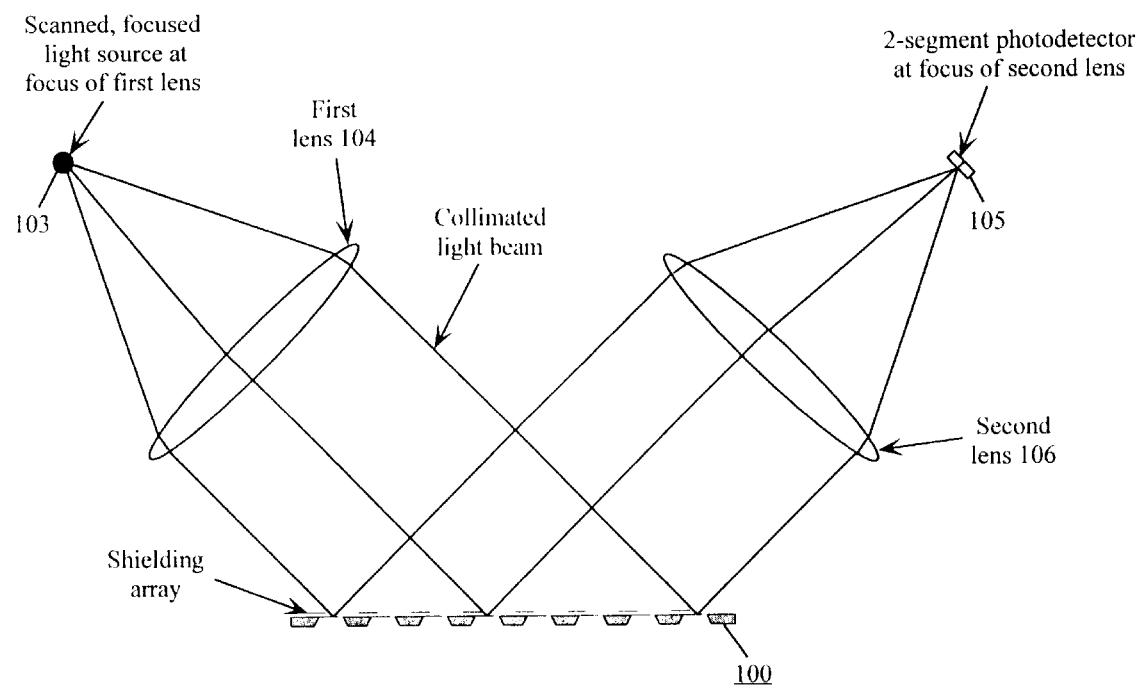
FIG. 10 is a drawing illustrating still another optical system employing a single photodetector for sensing the bending of cantilever elements of an array in accordance with the invention.

In still another optical read-out system, as shown in FIG. 10, a light source 103 may be focused via a first lens 104 such that a collimated beam is formed and projected via the lens so as to hit the array 100 at a large angle. By placing the photodetector at an equal and opposite angle, and by placing it at the focus of a second lens 106, the reflected rays from the array 100 arrive at a photodetector 105, as shown in FIG. 10. The use of two lenses enables the light source and the photodetector to be located on opposite and equal angles relative to the surface plane of the array of cantilever elements.

Figure 11:
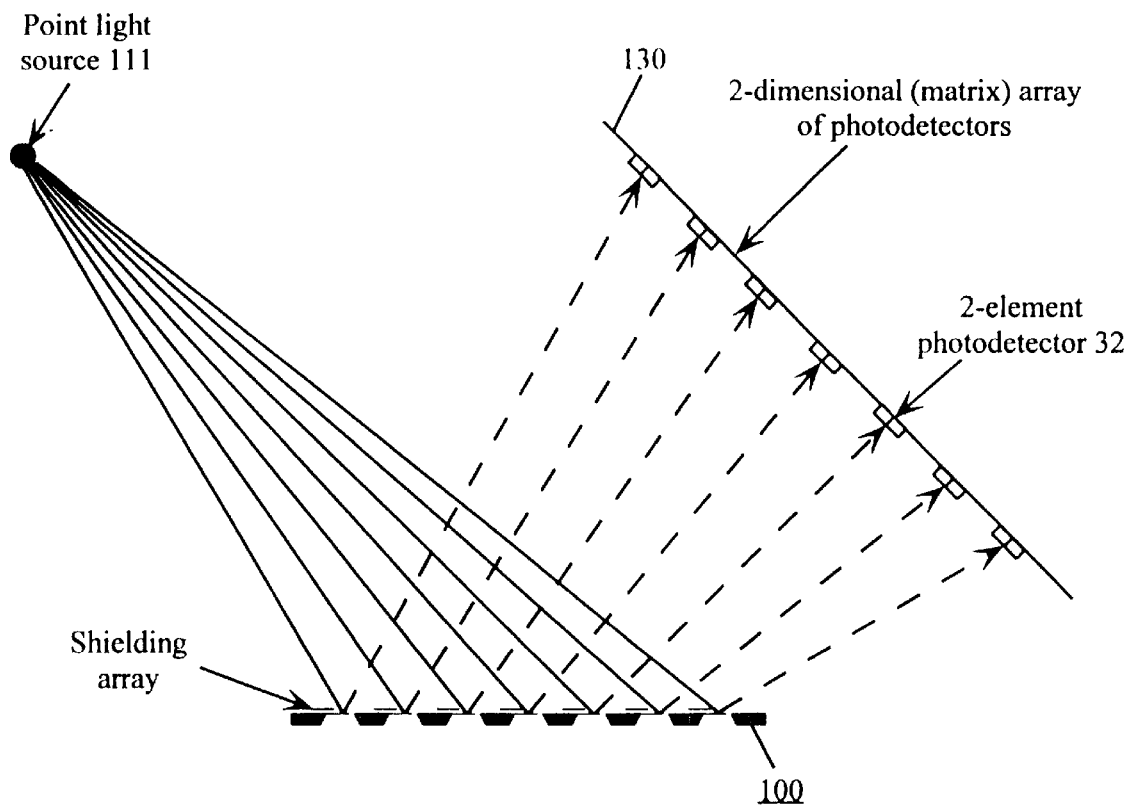
FIG. 11 is a drawing illustrating an optical system employing a point light source and a 2-dimensional array of photodetectors for sensing the bending of cantilever elements of an array in accordance with the invention.

FIG. 11 illustrates that an optical read-out system may be designed with any light source that approximates a point source. Light from a point source 111 illuminates an array 100 from which it is reflected, with the reflected light impinging on an array 130 of photodetector pairs (e.g., 32), as shown in FIG. 11. The light reflected back to each photodetector pair of the photodetector array comes from a different cantilever. Thus, each photodetector pair measures the signal from a different part of the image. This embodiment eliminates the need to sweep (scan) the light beam across the cantilever array and the need for a lens.

Figure 12:
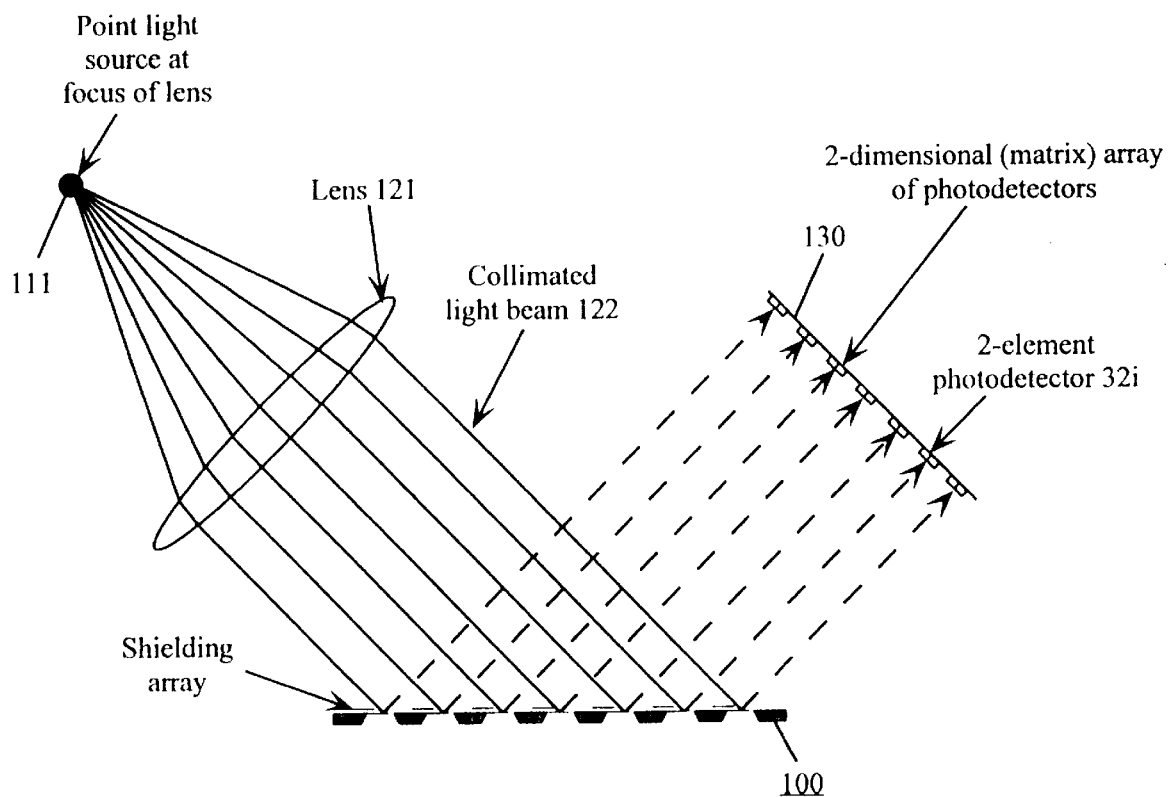
FIG. 12 is a drawing illustrating an optical system employing a 2-dimensional array of photodetectors for sensing the bending of cantilever elements of an array in accordance with the invention.

The system of FIG. 11 may be modified as shown in FIG. 12. Here, a lens 121 may be placed between the light source 111 and the cantilever array 100 in order to produce a collimated beam 122, as shown in FIG. 12. This helps to collect more of the light from the source 111 without requiring that the source be placed very close to the cantilever array 100. The light reflected from each element of the cantilever array is then reflected onto the photodetector elements 32$i$ of a photodetector array 130. In this arrangement the light projected onto the cantilever array need not be swept (scanned) and there is greater flexibility in the mounting of the light source.

It should be appreciated that the various embodiments discussed above, for illuminating the cantilever array and for reading the imager being stored by the cantilever array, is by way of illustration and not by way of limitation. Clearly, many different optical arrangements for reading the contents of the cantilever array are within the ambit of this invention. Likewise, it should be appreciated that any element whose physical properties change as a function of absorbed EMR signals, and which can be made to reflect light, comes within the ambit of the invention.

What is claimed is:

1. A radiation detector comprising:

an array of micromachined cantilever elements, each cantilever element including first and second layers with the first layer being formed of a first radiation absorbing material and the second layer being formed of a second highly reflective material; the first and second materials have different coefficients of thermal expansion whereby each cantilever element bends in proportion to the amount of radiation energy absorbed by the first layer and converted into heat, each cantilever element being formed such that its first radiation absorbing layer is exposed to enable it to directly receive, without any intervening layer, incident electromagnetic signals emitted by an object whose image is to be detected and its second highly reflective layer is exposed to enable it to directly receive and reflect, without any intervening layer, illumination incident thereon; and means for illuminating the second layer of each cantilever element of the array for sensing the angle of light reflected from each cantilever element and determining the amount of radiation energy absorbed by each cantilever element of the array.

2. A radiation detector as claimed in claim 1 wherein said first layer is comprised of a layer of silicon nitride and wherein said second layer is comprised of a layer of aluminum.

3. A radiation detector as claimed in claim 1 wherein the thickness of the first layer ranges from 10 nanometers to 20 micrometers and the thickness of the second layer ranges from 10 nanometers to 20 micrometers.

4. A radiation detector as claimed in claim 1 wherein the array of cantilever elements is formed on a substrate, wherein each cantilever element is attached at one end to the substrate with the remaining sides of each cantilever element being detached from the substrate, whereby each cantilever element is free to bend about a rest position.

5. A radiation detector as claimed in claim 4, wherein the substrate region under each cantilever element is removed to form each cantilever such that its first and second layers are fully exposed.

6. A radiation detector as claimed in claim 1, wherein said means for projecting light onto the second layer includes means for sweeping a light beam across the second layer of each cantilever element.

7. A radiation detector as claimed in claim 6 wherein said means for sweeping a beam of light includes a lens arrangement for causing the light beam being swept across each cantilever element to be projected onto each cantilever element, one at a time and at the same angle.

8. A radiation detector as claimed in claim 7, wherein said beam of light is a laser light source.

9. A radiation detector as claimed in claim 1, wherein said means for sensing the amount light reflected from each cantilever element of the array includes a photodetector.

10. A radiation detector as claimed in claim 9, wherein said photodetector includes an array of photodetecting elements.

11. A radiation detector as claimed in claim 9, wherein said photodetector includes a one-dimensional array of photodetecting elements.

12. A radiation detector as claimed in claim 9, wherein said photodetector is a two segment photodiode.

13. A radiation detector as claimed in claim 1, wherein the radiation absorbing material of each cantilever element is designed to absorb electromagnetic radiation energy.

14. A radiation detector as claimed in claim 10, wherein the means for illuminating the cantilevers is a point light source.

15. A radiation detector as claimed in claim 1 wherein said cantilever array is a two-dimensional array.

16. A radiation detector as claimed in claim 1 wherein said cantilever array is a one-dimensional array.

17. A radiation detector comprising:

an array of micromachined cantilever elements, each cantilever element including first and second layers with the first layer being formed of a first radiation absorbing material and the second layer being formed of a second highly reflective material; the first and second materials have different coefficients of thermal expansion whereby each cantilever element bends in proportion to the amount of radiation energy absorbed by the first layer and converted into heat, each cantilever element being formed such that its first radiation absorbing layer is exposed to enable it to directly receive, without any intervening layer, incident electromagnetic signals emitted by an object whose image is to be detected and its second highly reflective layer is exposed to enable it to directly receive and reflect, without any intervening layer, illumination incident thereon;

the first layer of all the cantilever elements of the array being arranged for receiving electromagnetic radiation (EMR) signals; and the second layer of all the cantilever elements of the array being arranged for receiving incident illumination and each cantilever element reflecting the incident illumination at an angle proportional to the extent it is bent.

18. A radiation detector as claimed in claim 17 including a light source and means for projecting light from said light source onto said second layer.

19. A radiation detector as claimed in claim 17 wherein the thickness of the first layer ranges from 10 nanometers to 20 micrometers and the thickness of the second layer ranges from 10 nanometers to 20 micrometers.

20. A radiation detector comprising:

an array of micromachined cantilever elements, each cantilever element including first and second layers with the first layer being formed of a first radiation absorbing material and the second layer being formed of a second highly reflective material; the first and second materials have different coefficients of thermal expansion whereby each cantilever element bends in proportion to the amount of radiation energy absorbed by the first layer and converted into heat; and means for illuminating the second layer of each cantilever element of the array including means for sweeping a light beam across the second layer of each cantilever element for sensing the angle of light reflected from each cantilever element and determining the amount of radiation energy absorbed by each cantilever element of the array.

21. A radiation detector as claimed in claim 20 wherein said means for sweeping a beam of light includes a lens arrangement for causing the light beam to be swept across each cantilever element to be projected onto each cantilever element, one at a time and at the same angle.

22. A radiation detector as claimed in claim 21, wherein said beam of light is a laser light source.

* * * * *